United States Patent [19]

Shamir et al.

[11] Patent Number: 4,748,668

[45] Date of Patent: May 31, 1988

[54] METHOD, APPARATUS AND ARTICLE FOR IDENTIFICATION AND SIGNATURE

[75] Inventors: Adi Shamir; Amos Fiat, both of Rehovot, Israel

[73] Assignee: Yeda Research and Development Company Limited, Rehovot, Israel

[21] Appl. No.: 883,247

[22] Filed: Jul. 9, 1986

[51] Int. Cl.$^4$ .................................................. H04L 9/00
[52] U.S. Cl. .......................................... 380/30; 380/28
[58] Field of Search .................................... 380/30, 28

[56] References Cited

PUBLICATIONS

"Use of the Signature Token to Create a Negotiable Document", by Donald W. Davies, Aug. 1983.
"Digitalized Signatures and Public-Key Functions as Intractable as Factorization", by Michael O. Rabin, Jan. 1979.
"A Fast Signature Scheme Based on Quadratic Inequalities", by Okamoto et al., IEEE, 1985.
"The Knowledge Complexity of Interactive Proof-Systems," by Shafi Goldwasser, ACM, 1985.
"Identity-Based Cryptosystems and Signature Schemes," by Adi Shamir, Dept. of Applied Mathematics, The Weizmann Institute of Science, Isreal.

Primary Examiner—Salvatore Cangialosi
Assistant Examiner—Aaron J. Lewis
Attorney, Agent, or Firm—Fleit, Jacobson, Cohn & Price

[57] ABSTRACT

A method and apparatus for simple identification and signature which enable any user to prove his identity and the authenticity of his messages to any other user. The method and apparatus are provably secure against any known or chosen message attack if factoring is difficult, and require only 1% to 4% of the number of modular multiplications previously required. The simplicity, security and speed of the method and apparatus derive from microprocessor-based devices which may be incorporated into smart cards, personal computers, passports, and remote control systems.

42 Claims, 2 Drawing Sheets

METHOD, APPARATUS AND ARTICLE FOR IDENTIFICATION AND SIGNATURE

BACKGROUND OF THE INVENTION

Field of the Invention

The present invention relates to a method and apparatus for simple identification and signature.

Creating unforgeable ID cards based on the emerging technology of smart cards is an important problem with numerous commercial and military applications. The problem becomes particularly challenging when two parties (the prover A and the verifier B) are adversaries, and one wants to make it impossible for B to misrepresent himself as A even after he witnesses and verifies arbitrarily many proofs of identity generated by A. Typical applications includes passports (which are often inspected and photocopied by hostile governments), credit cards (whose numbers can be copied by blank cards or used over the phone), computer passwords (which are vulnerable to hackers and wire tappers) and military command and control systems (whose terminals may fall into enemy hands). Three levels of protection may be distinguished between:

(1) Authentication: A can prove to B that he is A, but someone else cannot prove to B that he is A.

(2) Identification: A can prove to B that he is A, but B cannot prove to someone else that he is A.

(3) Signature: A can prove to B that he is A, but B cannot prove even to himself that he is A.

Authentication is useful only against external threats when A and B cooperate. The distinction between identification and signature is subtle, and manifests itself mainly when the proof is interactive and the verifier later wants to prove its existence to a judge. In identification, B can create a credible transcript of an imaginary communication by carefully choosing both the questions and the answers in the dialog, while in signature only real communication with A could generate a credible transcript. However, in many commercial and military applications the main problem is to detect forgeries in real time and to deny the service, access or response that the forger wants. In these cases the transcript and judge are irrelevant, and identification and signature requirements can be used interchangeably.

SUMMARY OF THE INVENTION

The new method and apparatus of the present invention is predicted upon a combination of zero-knowledge interactive proofs (Goldwasser, Micali and Rackoff (1985), The Knowledge Complexity of Interactive Proof Systems, 17th ACM Symposium on Theory of Computations, May 1985) and identity-based schemes (Shamir (1984) Identity-Based Cryptosystems and Signature Schemes, Proceedings of Crypto '84, Lecture Notes in Computer Science no. 196, Springer Verlag 1985). The theory of the present invention is based on the difficulty of extracting modular square roots when the factorization of n is unknown. A related protocol for proving the quadratic residuosity of numbers was presented by Fischer Micali and Rackoff at Eurocrypt, April 1984, A Secure Protocol for the Oblivious Transfer, but the new protocol of the present invention is faster and requires less communication, and provides a solution to practical identification and signature problems.

The method and apparatus utilizes a trusted center (a government, a credit card company, a computer center, a military headquarters, etc.) which issues identifiers such as smart cards, to users after properly checking their physical identity. No further interaction with the center is required either to generate or to verify proofs of identity. An unlimited number of users can join the system without degrading its performance, and it is not necessary to keep a list of all the valid users. Interaction with the smart cards will not enable verfiers to reproduce them, and even complete knowledge of the secret contents of all the cards issued by the center will not enable adversaries to create new identities or to modify existing identities. Since no information whatsoever is leaked during the interaction, the cards can last a lifetime regardless of how often they are used.

Figure 1:
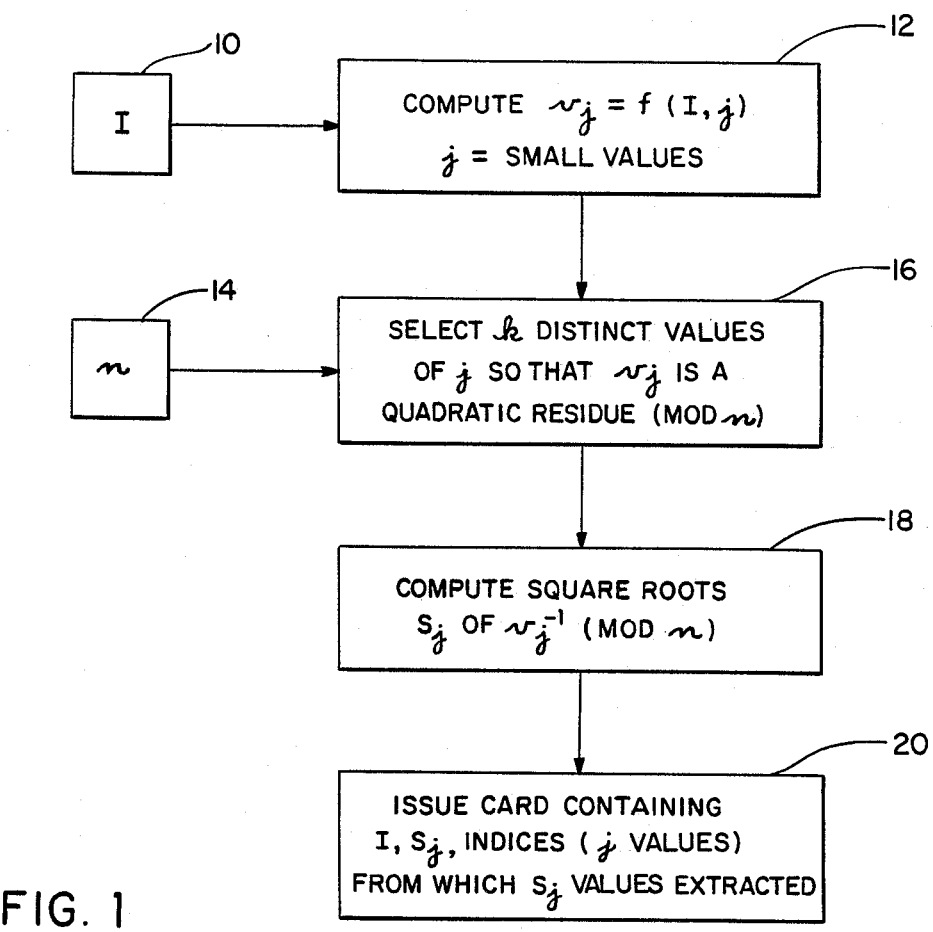
FIG. 1 is a block diagram showing the method and apparatus of the present invention for issuing an identifier, such as a smart card.

In the drawings and in the following detailed description, certain liberties have been taken regarding the communication, data links between the identifying apparatus (shown and described as a smart card) of a party or entity A and the verifying apparatus of a party or entity B. If the communication is to be in binary (described as the preferred embodiment) then, the actual links are between the I/O of the smart card and the I/O of the verifying device. For binary operations, the apparatuses are microprocessors including memories, usually ROMs to store information and the required program to carry out the operations described subsequently and the usual I/Os. The generation of random numbers can be accomplished by any known means, such as a noisy diode serving as a random source of bits with appropriate discrimination to obtain the random binary output. Usually, 512 bit numbers are used (corresponding to about 160 digits). Otherwise, the following description is rather straight forward and the novel apparatuses and the various steps of the unique method, as well as the devices, will be clear and evident.

DESCRIPTION OF THE PREFERRED EMBODIMENTS

Before a center starts issuing cards, it chooses and makes pubic a modulus n and a pseudo random function f which maps arbitrary strings to the range (O,n). The modulus n is the product of two secret primes p and q. Only the center knows the factorization of the modulus and thus everyone can use the same n. The function f should appear as a random function to polynomially bounded computations. Goldreich Goldwasser and Micali (1984), How to Construct Random Functions, 25th Symposium on Foundations of Computer Science, October 1984, describe a particular function which is provably strong in this sense, but in practice one can use simpler and faster functions (e.g., multiple DES, Data Encryption Standard) without endangering the security of the scheme.

Figure 2:
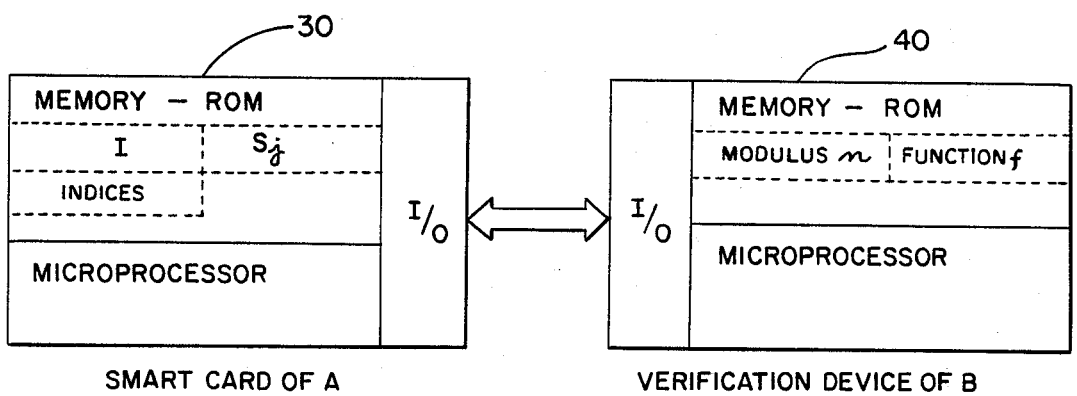
FIG. 2 is a schematic showing the interaction of an identifier, such as a smart card with a verifier according to the method and apparatus of the invention.

When an eligible user applies for a smart card, the center (see FIG. 1) prepares a string I which contains all the relevant information about the user (his name, address, ID number physical description, security clearance etc.) and about the card (expiration date, limitations or validity, etc.). Since this is the information verified by the method and apparatus of the invention, it is important to make it detailed (include enough information to make the user unique) and to double check its correctness. The center then performs the following steps as shown in FIG. 1. String I from block 10 is fed to block 12 where the values $v_j = f(I,j)$ for small values of j are computed using a microprocessor. The modulus n from block 14 and the output of block 12 are fed to block 16 in which k distinct values of j are picked for which $v_j$ is a quadratic residue (mod n). The output of block 16 passes to block 18 where square roots $s_j$ of $v_j^{-1}$ are computed using a microprocessor, for example, the smallest square roots. The output of block 18 passes to block 20 and the information of I, the k $s_j$ values, and their indices is recorded in the memory (ROM) of a smart card 30 (see FIG. 2).

To simplify notation in this specification, the first k indices $j = 1,2 \ldots k$ are used. Also, for non-perfect functions f, it may be desirable to ramdomize I by concatenating it to a long random string R which is chosen by the center, stored in the card, and revealed along with I. In typical implementations, preferably k is between 1 and 18, but larger values of k can further reduce the time and communication complexities. Preferably, n should be at least 512 bits long, a number of at least about 160 digits. Factoring such moduli seems to be beyond reach with today's computers and algorithms, with adequate margins of safety against foreseeable developments. However, it should be appreciated that for simpler, less secure systems, any size number can be chosen. The center can be eliminated if each user chooses his own n and publishes it in a public key directory. However, this variant makes the practice of the present invention considerably less convenient.

Figure 3:
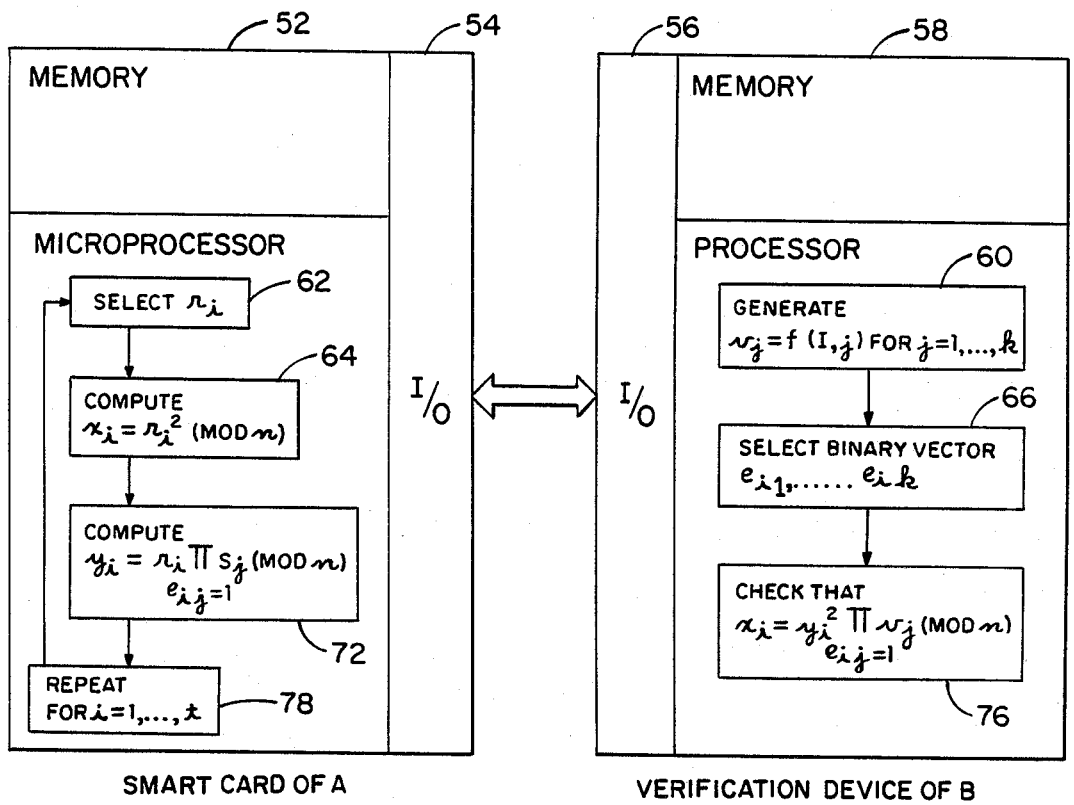
FIG. 3 is a block diagram showing details of the interaction in the microprocessors of the identifier and verifier according to the invention.

The verification devices 40 are identical standalone devices which contain a microprocessor, a small memory, and I/O interface. The only information stored in them are the universal modulus n and function f. When a smart card 30 is inserted into a verifier, it proves that it knows $s_1 \ldots s_k$ without giving away any information about their values. The proof is based on the following protocol, see FIG. 3.

First, the smart card 30 of party A sends I from memory 52 via I/O 54, I/O 56 to memory 58 of the verification device 40 of party B. Then device 40 in block 60 generates $v_j = f(I,j)$ for $j = 1 \ldots k$. The following steps are repeated for $i = 1 \ldots t$. Card 30 of A selects a random $r_i \in (0,n)$, preferably a 512 bit number, in block 62, compute $x_i = r_i^2 \pmod{n}$ in block 64 and sends $x_i$ to device 40, block 66. Device 40 generates in block 66 a random vector $(e_{i1} \ldots e_{ik})$ from a predefined collection of binary vectors (which preferably contains all such vectors) and sends to card 30. In response to the vector, card 30 computes in block 72

$$y_i = r_i \prod_{e_{ij}=1} s_j \pmod{n}$$

and sends $y_i$ to device 40 which then checks in block 76 that $$x_i = y_i^2 \prod_{e_{ij}=1} v_j \pmod{n}$$

The iteration need be repeated only a few times (typically t ranges from 1 to 4) to make the probability of erroneous identification sufficiently small, block 78. During each repeat, a new random number $r_i$ is selected. The verifier 40 of B accepts A's proof of identity only if all the t checks are successful. To decrease the number of communicated bits, $x_i$ can be hashed by sending only the first 128 bits of $f(x_i)$. The verifier 40 can check the correctness of this value by applying f in block 76 and comparing the first 128 bits of the results.

A particular message m (e.g., an instruction to a remote control system or a program sent to a remote computer) can be authenticated without having to extract new square roots by sending the first 128 bits of $f(m,x_i)$. If m is known to the verification device 40, this value can be easily checked in block 76. A is fully protected against modifications and forgeries of his messages by the pseudo random nature of f, but this is not a real signature technique. Without participating in the interaction, a judge cannot later decide if a message is authentic.

The probability of forgery is an absolute constant, $2^{-kt}$, and thus, there is no need to pick large values of k and t as a safeguard against future technological developments. In most applications, a security level of $2^{-20}$ suffices to deter cheaters. No one will present a forged passport at an airport, give a forged driver's license to a policeman, use a forged ID badge to enter a restricted area, or use a forged credit card at a department store, if he knows that his probability of success is only one in a million. In all these applications, the forged ID card (rather than the transcript of the communication) can be presented to a judge as evidence in a trial. Even if the only penalty for a failed attempt is the confiscation of the card, and smart cards cost only $1 to manufacture, each success will cost about one million dollars. For national security applications, the security level can be changed to $2^{-30}$. Even a patient adversary with an unlimited budget, who tries to misrepresent himself 1000 times each day, is expected to succeed only once every 3000 years.

To attain a $2^{-20}$ level of security, it suffices to choose $k=5$, $t=4$ (for $2^{-30}$, increase these values by 1). The average number of modular multiplications required to generate or verify a proof of identity in this case is $t(k+2)/2 = 14$. The number of bytes exchanged by the parties via the smart card 30 and verification device 40 during the proof is 323, and the secret $s_j$ values can be stored in a 320 byte ROM. Even better performance can be obtained by increasing k to 18 (a 1152 byte ROM). If $e_{ij}$ vectors are used with at most three 1's in them, there are a choise of 988 possible vectors in each iteration. With $t=2$ iterations, the security level remains about one in a million, but the number of transmitted bytes drops to 165 and the average number of modular multiplications drops to 7.6 (which is two order of magnitude faster than the 768 multiplications required by the known prior art of the Rivest, Shamir and Adleman signature scheme. Note that the $2 \times 18$ $e_{ij}$ matrix is so sparse that the verification device 40 of B has to generate at most 6 out of $18 v_j$ values to verify the proof. This is the preferred mode of the invention vis-a-vis identification.

The time, space, communication and security of the present invention can be traded off in many possible ways, and the optimal choices of k, t and the $e_{ij}$ matrix depends on the relative costs of these resources. Further improvements in speed can be obtained by parallelizing the operations. Unlike the prior art, the two parties can pipeline their operations (with A preparing $x_{i+1}$ and $y_{i+1}$ while B is still checking $x_i y_i$) and use parallel multipliers to compute the product of $v_j$ or $s_j$ values in log k depth. Since there are no gcd or modular division operations, each iteration of the protocol is in NC, and thus, the invention is suitable for very high speed applications.

Figure 4:
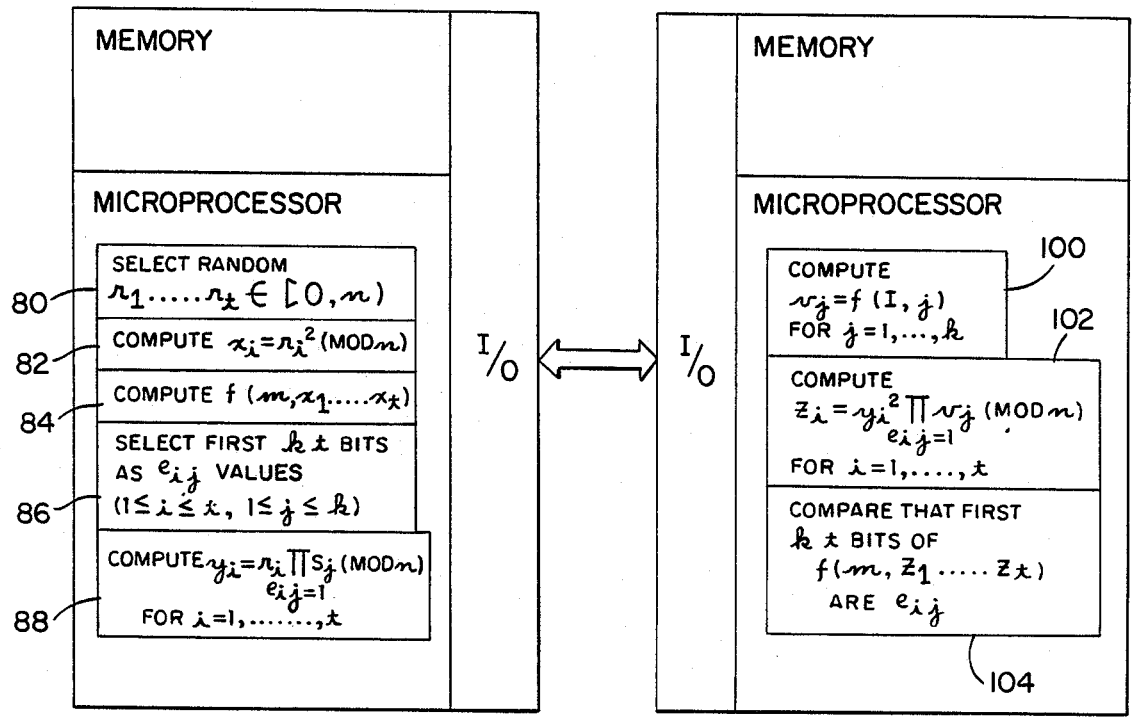
FIG. 4 is a block diagram similar to FIG. 3 showing the essential interactions to verify signature.

In a further development of the present invention, a method and apparatus for verifying digital signatures are provided. B's role in the interactive identification method is passive but crucial. The random $e_{ij}$ matrix sent contains no information but its unpredictability prevents cheating by A. To turn the described identification method into a signature method, B's role is replaced by the pseudo random function f. To sign a message m, the following method is utilized, see Fig. 4. First, a random $r_1 \ldots r_t \epsilon (O,n)$ is selected, block 80 and then $x_i = r_i^2 \pmod{n}$ is computed, block 82. The numbers selected in block 80 are random 512 bit numbers and are obtained by conventional means such as a noisy diode to provide a random source of bits which are discriminated to obtain a random binary number of 512 bits. Next, the function $f(m,x_1 \ldots x_t)$ is computed, block 84 and a subset of kt bits are extracted from it in block 86 as $e_{ij}$ values ($1 \leq i \leq t, 1 \leq j \leq k$). The function f is a pseudo random function, as previously described. The first kt bits can be used as a random selection, $e_{ij}$, and substitute for the random binary vector of FIG. 3.

Finally, $$y_i = r_i \prod_{e_{ij}=1}^{\pi} s_j \pmod{n}$$

for $i=1 \ldots t$, is computed, block 88 and I, m, the $e_{ij}$ matrix and all the $y_i$ values are sent by A (smart card 30) to the verification device 40 of B.

For B to verify A's signature on m, the following steps are taken. First, $v_j = f(I,j)$ for $j=1 \ldots k$ is computed, block 100. Next, $$z_i = y_i^2 \prod_{e_{ij}=1}^{\pi} v_j \pmod{n}$$

for $i=1 \ldots t$, is computed, block 102, using the $e_{ij}$ matrix received from A. Finally, B verifies that the kt bits extracted from $f(m, z_1 \ldots z_t)$ are $e_{ij}$, block 104.

The sequential version of the interactive identification method and apparatus according to the present invention is zero-knowledge and thus B cannot deduce any information whatsoever about the $s_j$ values from his interaction with A. The parallel identification method and the signature method on the other hand, cannot be proven zero-knowledge for very subtle technical reasons. In both cases, the difficulties demonstrate the fragility and inflexibility of the definitions of zero-knowledge rather than real weaknesses of the present invention. The notion of zero-knowledge is extremely restrictive, and prevents A from sending to B even useless information about a secret s. This difficulty in decision problems (is w a member of the language L?) becomes almost impossible to solve in computation problems (generate a member w of the language L), in which A must reveal w to B. In fact, strong signature schemes cannot be zero-knowledge by definition. If everyone can recognize valid signatures but no one can forge them, B cannot generate by himself A's messages with the same probability distribution. However, the information about the $s_j$ values that B gets from signatures generated by A is so implicit that it cannot be used to forge new signatures, and thus the signature aspect of the present invention is provably secure (if factoring is difficult) even though it is not zero-knowledge.

In the proposed signature method of the present invention, an adversary knows in advance whether his signature will be accepted as valid, and thus be experimenting with $2^{kt}$ random $r_i$ values, he is likely to find a signature he can send to B. Consequently, the product kt must be increased from 20 to at least 72 when the indentification technique is replaced by a signature technique, but smaller values of kt can still be used for less secure applications.

A choice of $k=9$, $t=8$ attains the desired $2^{-72}$ security level. The private key can be stored in a 576 byte ROM, and each signature requires 521 bytes. The average number of modular multiplications for this choice is $t(k+2)/2 = 44$. By doubling the key size to 1152 bytes ($k=18$), the size of each signature can be reduced to 265 bytes ($t=4$) without changing the $2^{-72}$ security level. By optimizing the order of the multiplications to compute the t ($=4$) subset products simultaneously, their average number can be reduced to 32. This is only 4% of the number of multiplications required in prior known signature techniques. Other points along the tradeoff curve for the $2^{-72}$ security level are summarized in Table 1.

TABLE 1

| Tradeoffs for k and t at the $2^{-72}$ Security Level | | | | | |
|---|---|---|---|---|---|
| k | t | Secret Key Size (in bytes) | Signature Size (in bytes) | Average # Mult. (Standard) | Average # Mult. (Optimized) | Average # $v_i$'s B generates |
| 1 | 72 | 64 | 4608 + 9 | 108 | 108 | 1 |
| 2 | 36 | 128 | 2304 + 9 | 72 | 64 | 2 |
| 3 | 24 | 102 | 1536 + 9 | 60 | 49 | 3 |
| 4 | 18 | 256 | 1152 + 9 | 54 | 46 | 4 |
| 6 | 12 | 384 | 768 + 9 | 48 | 41 | 6 |
| 8 | 9 | 512 | 576 + 9 | 45 | 45 | 8 |
| 9 | 8 | 576 | 512 + 9 | 44 | 44 | 9 |
| 12 | 6 | 768 | 384 + 9 | 42 | 35 | 12 |
| 18 | 4 | 1152 | 256 + 9 | 40 | 32 | 17 |
| 24 | 3 | 1536 | 192 + 9 | 39 | 28 | 21 |
| 36 | 2 | 2304 | 128 + 9 | 38 | 30 | 24 |
| 72 | 1 | 4608 | 64 + 9 | 37 | 37 | 36 |

A unique feature of the new identification and signature method and apparatus of the present invention is that it is possible to change the level of security after the key has been chosen. Consider, for example, an access card with $k=18$ $S_j$ values. The fast screening procedure at the entrance to a building will be controlled, e.g., with $t=1 (2^{-18}$ security level), access to a computer room will be controlled e.g., by $t=2$ ($2^{-36}$ security level), while any usage of the computer will leave signed audit trails with $t=4$ ($2^{-72}$ security level). The only dangerous case is the simultaneous usage of the same $s_j$ values in a parallel identification technique with a large t and in a signature technique with a small t (an unlikely combination), which is susceptible to an active playback attack.

Since the verification devices store only small amounts of publicly available information, it is possible to standardize them. One device can store several values of n and f and thus check a variety of personal, financial and occupational ID cards provided by many independent organizations. This possibility is particularly important in department stores which have to recognize many types of credit cards or in check cashing situations which require three ID cards of many possible types.

The present invention can be generalized in a variety of ways. For example, the square roots can be replaced by cubic or higher roots, the $e_{ij}$ matrix can be made non-binary, and the usage of $r_i$ and $s_j$ values can be made more symmetric in the generation of each $y_i$ value.

Although the present invention has been shown and described with reference to specific embodiments, nevertheless, changes are possible which will be apparent to those skilled in the art which do not depart from the spirit and scope of the invention. Such changes are deemed to come within the purview of the invention as claimed.

What is claimed:

1. A method of creating a unique identifier for use by an entity which cannot be forged by others including those capable or verifying the entity, comprising the steps of:
    (a) selecting a modulus n which is the product of at least two secret primes;
    (b) selecting a pseudo random function f capable of mapping arbitrary strings to numbers;
    (c) preparing a string I containing information unique to an entity;
    (d) selecting k distinct values of j so that each $v_j = f(I,j)$ is a residue (mod n) having a root $s_j$;
    (e) computing roots $s_j$ of $v_j^{-1}$ (mod n);
    (f) recording on a retrievable medium of an identifier I, k, $s_j$ and related indices j.

2. The method of claim 1 wherein the recording on the identifier is in binary form.

3. The method of claim 1 wherein the recording is in a ROM and the identifier includes microprocessing and input/output features.

4. A method of utilizing the identifier of claim 1 comprising:
    (a) placing the identifier of claim 1 in communication with a verifier having recorded therein modulus n and pseudo random function f;
    (b) transmitting I and the indices j from the identifier to the verifier;
    (c) generating in the verifier $v_j = f(I,j)$ for the indices j;
    (d) selecting in the identifier a random $r_i \in (O,n)$;
    (e) computing $x_i = r_i^2$ (mod n) in the identifier and sending $x_i$ to the verifier;
    (f) selecting a random binary vector $e_{i1} \ldots e_{ik}$ from a predetermined set of such vectors in the verifier and sending to the identifier;
    (g) computing in the identifier $$y_i = r_i \prod_{e_{ij}=1} s_j \pmod{n}$$

and sending $y_i$ to the verifier;
    (h) checking in the verifier $$x_i = y_i^2 \prod_{e_{ij}=1} v_j \pmod{n};$$

(i) repeating steps (d) through (h) t times, where $t \geq 1$.

5. The method of claim 4 wherein the transmissions between the identifier and verifier are carried out in binary form.

6. The method of claim 4 wherein all steps are carried out using binary signals.

7. The method of claim 6 wherein modulus n is composed of at least 512 bits.

8. The method of claim 6 wherein only a lashed version of $x_i$ is used.

9. The method of claim 6 wherein steps (d) through (h) are repeated at least two times.

10. A method of signing a message m exchanged between an identifier created according to claim 1 and verifier comprising:
    (a) selecting in the identifier random $r_i \ldots r_t \in (O,n)$;
    (b) computing in the identifier $x_i = r_i^2$ (mod n);
    (c) computing in the identifier $f(m, x_1 \ldots x_t)$ and extracting from it kt bits as $e_{ij}$ values;
    (d) computing in the identifier $$y_i = r_i \prod_{e_{ij}=1} s_j \pmod{n}$$

for $i = 1 \ldots t$;
    (e) sending to the verifier I, the indices j, m, the $e_{ij}$ matrix and all the $y_i$ values;
    (f) computing in the verifier $v_j = f(I,j)$ for the indices j;
    (g) computing in the verifier $$z_i = y_i^2 \prod_{e_{ij}=1} v_j \pmod{n}$$

and
    (h) verifying the signature to message m by determining whether the kt bits extracted from $f(m, z_1 \ldots z_t)$ are the same as $e_{ij}$.

11. The method of claim 10 wherein the first kt bits of $f(m, z_1 \ldots z_t)$ are used as $e_{ij}$ matrix.

12. The method of claim 10 wherein the exchange is in binary form.

13. The method of claim 10 wherein the product kt is at least 72.

14. The method of claim 10 wherein k is at least 18 and t is at least 4.

15. Apparatus for creating a unique identifier for use by an entity and unforgeable by others including those capable of verifying the entity, comprising:
    (a) means for selecting k distinct indices of j so that each $v_j = f(I,j)$ is a quadratic residue (mod n);
    (b) where f is a pseudo random function f capable of mapping arbitrary strings to numbers in the range (0,n) and n is a modulus which is the product of at least two secret primes and I is a string containing information unique to an entity;
    (c) means for computing roots $s_j$ of $v_j^{-1}$ (mod n); and
    (d) means for recording on a retrievable medium of an identifier I, $s_j$ and related indices.

16. The apparatus of claim 15 wherein the recording on the identifier is in binary form.

17. The apparatus of claim 15 wherein the recording is in a ROM and the identifier includes microprocessing and input/output features.

18. Apparatus for utilizing the identifier of claim 15 comprising:
(a) means for placing the identifier of claim 1 in communication with a verifier having recorded therein modulus n and pseudo random function f;
(b) means for transmitting I and the indices j from the identifier to the verifier;
(c) means for generating in the verifier $v_j = f(I,j)$ for the selected indices j;
(d) means for selecting in the identifier a random $r_i''(0,n)$;
(e) means for computing $x_i = r_i^2 \pmod{n}$ in the identifier and sending $x_i$ to the verifier;
(f) means for selecting a random vector $e_{i1} \ldots e_{ik}$ in the verifier and sending to the identifier;
(g) means for computing in the identifier $$y_i = r_i \prod_{e_{ij}=1} s_j \pmod{n}$$

and sending to the verifier;
(h) means for checking in the verifier $$x_i = y_i^2 \prod_{e_{ij}=1} v_j \pmod{n};$$

and
(i) means for repeating steps (d) through (h) at least once.

19. The apparatus of claim 18 wherein the transmissions between the identifier and verifier are carried out in binary form.

20. The apparatus of claim 18 wherein all steps are carried out using binary signals.

21. The apparatus of claim 20 wherein modulus n is composed of at least 512 bits.

22. The apparatus of claim 20 wherein only a hased version of $x_i$ is used.

23. The apparatus of claim 20 wherein steps (d) through (h) are repeated at least two times.

24. Appratus for signing a message m exchanged between an identifier created according to claim 1 and a verifier comprising:
(a) means for selecting in the identifier random $r_i \ldots r_t \epsilon(0,n)$;
(b) means for computing in the identifier $x_i = r_i^2 \pmod{n}$;
(c) means for computing in the identifier $f(m, x_i \ldots x_t)$ and extracting from it kt bits as $e_{ij}$ values;
(d) means for computing in the identifier $$y_i = r_i \prod_{e_{ij}=1} s_j \pmod{n}$$

for i=1 ... t;
(e) means for sending to the verifier I, m, the $e_{ij}$ matrix and all the $y_i$ values;
(f) means for computing in the verifier $v_j = f(I,j)$ for the indices j;
(g) means for computing in the verifier $$z_i = y_i^2 \prod_{e_{ij}=1} v_j \pmod{n}$$

for i=1 ... t; and
(h) means for verifying the signature to message m by determining whether the kt bits extracted from f(m, $z_1 \ldots z_t$) are the same as $e_{ij}$.

25. The apparatus of claim 24 wherein the exchange is in binary form.

26. The apparatus of claim 24 wherein the product kt is at least 72.

27. An identifier comprising microprocessor means, memory means and I/O means and having recorded in said memory means a string I containing information unique to an entity, a modulus n which is the product of at least two secret primes, a pseudo random function f capable of mapping arbitrary strings to numbers, indices; and values $v_j$ which are quadratic residues (mod n), values $s_j$ which are roots of $v_j^{-1}$ (mod n), said microprocessor means including selection means for selecting a number $r_i \epsilon(0,n)$, and computing means for computing $x_i = r_i^2 \pmod{n}$ and $$y_i = r_i \prod_{e_{ij}=1} s_j \pmod{n}$$

in responsive to receiving a binary vector $e_{i1} \ldots e_{ik}$.

28. An identifier according to claim 27, wherein the microprocessor means includes loop means for repeating the selection of $r_i$ and computing of $x_i$ and $y_i$.

29. An identifier according to claim 27 wherein the microprocessor means includes selection means for selecting random $r_i \ldots r_t \epsilon(0,n)$, computing means for computing $x_i = r_i^2 \pmod{n}$, computing means for computing $f(m, x_i \ldots x_t)$, selection means for extracting from it kt bits as $e_{ij}$ values, and computing means for computing $$y_i = r_i \prod_{e_{ij}=1} s_j \pmod{n}$$

for i=1 ... t.

30. A verification device for use with the identifier of claim 27, comprising microprocessor means, memory means and I/O means and having recorded in said memory means modulus n and function f, said microprocessor means including generating means for generating values of $v_j = f(I,j)$ for the indices j; selection means for selecting a binary vector $e_{i1} \ldots e_{ik}$, and checking means for checking that $$x_i = y_i^2 \prod_{e_{ij}=1} v_j \pmod{n}.$$

31. A verification device according to claim 30 for use with the identifier of claim 27, wherein the microprocessor means includes computing means for computing $$z_i = y_i^2 \prod_{e_{ij}=1} v_j \pmod{n}$$

for i=1 ... t and comparing means for comparing that the kt bits extracted from f(m, $z_1 \ldots z_t$) are $e_{ij}$.

32. The method of claim 1 including the step of placing the numbers $v_j$ in a public key directory.

33. The method of claim 4 including the steps of placing the numbers $v_j$ in a public key directory, and retrieving the numbers $v_j$ from the public key directory.

34. A method of utilizing the identifier of claim 1 comprising:
(a) placing the identifier of claim 1 in communication with a verifier having recorded therein modulus n and pseudo random function f;
(b) transmitting the numbers $v_j$ along with a signature of a trusted center from the identifier to the verifier;
(c) selecting in the identifier a random $r_i \epsilon (O,n)$;
(d) computing $x_i = r_i^2 \pmod{n}$ in the identifier and sending $x_i$ to the verifier;
(e) selecting a random binary vector $e_{i1} \ldots e_{ik}$ from a predetermined set of such vectors in the verifier and sending to the identifier;
(f) computing in the identifier $$y_i = r_i \prod_{e_{ij}=1} s_j \pmod{n}$$

and sending $y_i$ to the verifier;
(g) checking in the verifier $$x_i = y_i^2 \prod_{e_{ij}=1} v_j \pmod{n};$$

and
(h) repeating steps (d) through (h) at least once.

35. The method of claim 4 wherein the repetition of steps (d) through (h) are carried out in parallel.

36. A method of signing a message m by an identifier created according to claim 1 comprising:
(a) selecting in the identifier random $r_i \ldots r_t \epsilon (O,n)$;
(b) computing in the identifier $x_i = r_i^2 \pmod{n}$;
(c) computing in the identifier $f(m, x_i \ldots x_t)$ and extracting from it kt bits as $e_{ij}$ values ($1 \leq i \leq t$, $1 \leq j \leq k$);
(d) computing in the identifier $$y_i = r_i \prod_{e_{ij}=1} s_j \pmod{n}$$

for i=1...t; and
(e) storing I, indices j, m, and $e_{ij}$ matrix and all the $y_i$ values.

37. A method of verifying the stored signature of a stored message m as defined in claim 36 including the steps of:
(a) retrieving I, the indices j, m, and $e_{ij}$ matrix and all the $y_i$ values from storage;
(b) computing in the verifier $v_j = f(I,j)$ for the indices j;
(c) computing in the verifier $$z_i = y_i^2 \prod_{e_{ij}=1} v_j \pmod{n};$$

and
(d) verifying the signature to message m by determining whether the kt bits extracted from $f(m, z_1 \ldots z_t)$ are the same as $e_{ij}$.

38. Apparatus as defined in claim 15 further including means for establishing a public key directory and means for recording the I, $v_j$ and related indices in said public key directory.

39. Apparatus as defined in claim 38 further including means for retrieving the I, $v_j$ and related indices from said public key directory.

40. Apparatus for utilizing the identifier of claim 15 comprising:
(a) means for placing the identifier of claim 1 in communication with a verifier having recorded therein modulus n and pseudo random function f;
(b) means for transmitting the numbers $v_j$ along with a signature of a trusted signature from the identifier to the verifier;
(c) means for selecting in the identifier a random $r_i \epsilon (0,n)$;
(d) means for computing $x_i = r_i^2 \pmod{n}$ in the identifier and sending $x_i$ to the verifier;
(e) means for selecting a random vector $e_{i1} \ldots e_{ik}$ in the verifier and sending to the identifier;
(f) means for computing in the identifier $$y_i = r_i \prod_{e_{ij}=1} s_j \pmod{n}$$

and sending to the verifier;
(g) means for checking in the verifier $$x_i = y_i^2 \prod_{e_{ij}=1} v_j \pmod{n};$$

(h) means for repeating steps (d) through (h) at least once.

41. Apparatus for signing a message m exchanged between an identifier created according to claim 1 and a verifier comprising:
(a) means for selecting in the identifier random $r_i \ldots r_t \epsilon (O,n)$;
(b) means for computing in the identifier $x_i = r_i^2 \pmod{n}$;
(c) means for computing in the identifier $f(m, x_i \ldots x_t)$ and extracting from it kt bits as $e_{ij}$ values;
(d) means for computing in the identifier $$y_i = r_i \prod_{e_{ij}=1} s_j \pmod{n}$$

for i=1...t; and
(e) means for storing the verifier I, the indices j, m, the $e_{ij}$ matrix and all the $y_i$ values.

42. The apparatus according to claim 41 including
(a) means for retrieving the verifier I, the indices j, m, the $e_{ij}$ matrix and all the $y_i$ values from storage;
(b) means for computing in the verifier $v_j = f(I,j)$ for the indices j;
(c) means for computing in the verifier $$z_i = y_i^2 \prod_{e_{ij}=1} v_j \pmod{n}$$

for i=1...t; and
(d) means for verifying the signature to message m by determining whether the kt bits extracted from $f(m, z_1 \ldots z_t)$ are the same as $e_{ij}$.

* * * * *

UNITED STATES PATENT AND TRADEMARK OFFICE
CERTIFICATE OF CORRECTION

PATENT NO. : 4,748,668

DATED : May 31, 1988

INVENTOR(S) : Shamir et al.

It is certified that error appears in the above-identified patent and that said Letters Patent is hereby corrected as shown below:

Column 2, line 54, "pubic" should be --public--.

Signed and Sealed this

Twelfth Day of February, 1991

Attest:

HARRY F. MANBECK, JR.

*Attesting Officer*  *Commissioner of Patents and Trademarks*